G. E. VANDERBURGH.
Apparatus for Treating Silicious Substances.
No. 28,540.
Patented May 29, 1860.
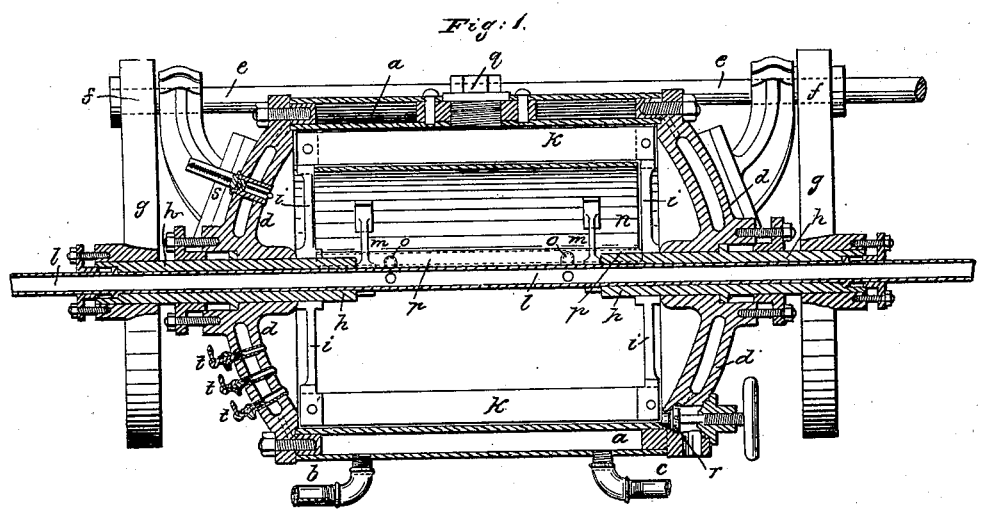
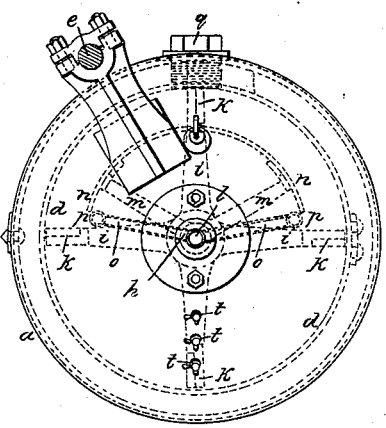

UNITED STATES PATENT OFFICE.

GEO. E. VANDERBURGH, OF MAMARONECK, NEW YORK, ASSIGNOR TO THE LIQUID QUARTZ COMPANY, OF NEW YORK, N. Y.

PREPARATION OF SOLUBLE SILICATES.

Specification forming part of Letters Patent No. 28,540, dated May 29, 1860; Reissued April 1, 1862, No. 1,297.

*To all whom it may concern:*

Bt it known that I, GEORGE E. VANDERBURGH, of Mamaroneck, in the county of Westchester and State of New York, have invented a new and improved method of reducing silicious substances to a fluid state, by which I am enabled to produce at a small expense a silicate containing over eighty per cent. of silex; and I do hereby declare that the following is a full and exact description of said invention, reference being had to the accompanying drawings, which form a part of this specification.

I first incorporate a small percentage of some alkaline base with the silicious substance to be operated upon, and then bring the said composition into direct contact with super-heated steam while inclosed within a suitable vessel, which process instantly reduces the said composition to a liquid state.

The apparatus employed in my improved method of reducing silicious substances to a fluid state, may be of any suitable style and character, provided the same be made of the requisite degree of strength, and provided the digesting portion of the said apparatus is so arranged that the silicious and alkaline composition to be placed therein, can be retained, while in an undissolved state, in the upper portion of the digesting chamber, or be continuously raised above the surface of the liquid in the lower portion of the same, for the purpose of enabling the superheated steam, let into said chamber, to act directly upon the said composition.

In the accompanying drawings, Figure 1, is a section, and Fig. 2, an end view of a digesting chamber which may be advantageously employed as a portion of the apparatus for carrying out my said invention.

The digesting-chamber is of a cylindrical shape and is composed of double sides $a, a,$ and double heads $d, d,$ combined with each other in any suitable manner. The heads $d, d,$ of said chamber, are centrally perforated for the reception of the short hollow-shafts $h, h,$ which work in packing boxes within said perforations. The pipe $l,$ which conducts the superheated steam into the digester, passes through the shafts $h, h,$ and the joints between the said pipe and shafts are rendered steam-tight by means of any suitable packing. The hollow-shafts $h, h,$ have radial arms upon their inner ends which are connected to elevators $k, k,$ within the digester, that extend the entire length of the same while their outer edges are brought nearly in contact with the inner casing of the digester. Arms $m, m,$ from the main steam-pipe $l,$ support the curved shield $n;$ and radial hollow arms $o, o,$ from the said steam-pipe $l,$ support the slitted longitudinal steam-pipes $p, p,$ which discharge the superheated steam into the digester.

The proportions of the above mentioned parts is such that the elevators $k, k,$ can revolve freely around the shield $n,$ and the slitted steam-pipes $p, p.$ Motion is imparted to the elevators $k, k,$ by means of the toothed wheels $g, g,$ on the shafts $h, h,$ and the pinions $f, f,$ on the driving shaft $e.$ The said digester is provided with a man-hole, and with other suitable valve-closed openings; and also with an instrument for indicating the temperature within the same; $q,$ is the man-hole stopper; $r,$ the valve that closes the aperture through which the silicate is withdrawn from the digester; $t, t,$ the try cocks, and $s,$ the instrument for indicating the temperature within the digester. Steam may be admitted into the space between the double casings and the double heads of the digester, and the water of condensation be withdrawn from said spaces by means of suitable pipes.

In the production of a liquid silicate by my said improved process, the silicious substance that I employ is usually clean sand, and the alkaline substance employed in said process, is usually commercial potash or soda. But in the place of sand in the said process, silicious stones may be employed after they have been reduced to the proper degree of fineness by any of the well known methods. The proportions of the silicious and the alkaline substances composing the mixture which I place within a digester to be operated upon by super-heated steam in the within described manner, are about eighty five per-cent of the former to fifteen per-cent of the latter.

The uses of the liquid silicate produced by my said improved method, and the important results that will follow from the use of said article, are so numerous that I shall not attempt to name all of them in this specification. The following may be specified as a few of the uses of the said liquid silicate.

1st. The surfaces of blocks of stone may be rendered impervious to the action of water and also to that of nearly all the acids, by impregnating the same with the said liquid silicate.

2nd. The surfaces of all articles molded or fashioned from clay, sand, plaster, or lime, or any mixture of said ingredients, or any others of a similar nature, may be rendered impervious to the action of water or acids by impregnating the same with the said liquid silicate.

3rd. The surfaces of planks, boards, and all descriptions of timber, and also all articles made of wood, can be rendered water-proof and fire-proof by saturating the same with the said liquid silicate. The staves of barrels which are to contain oils, or spirits of turpentine, may also be rendered impervious to those articles by saturating them with the said liquid silicate. Ships' bottoms may also be rendered worm-proof by impregnating the same with the said liquid silicate.

4th. By taking any suitable grinding, gritty, or polishing material, such as sand, or disintegrated emery, quartz, spar, pomace, flint, &c. and incorporating any suitable number of said ingredients with a proper quantity of the aforesaid liquid silicate, a paste may be formed that can be compactly molded into the form of a mill-stone, or into a polishing wheel, a whet-stone, a hone, a razor-strop, a scythe-rifle, or any other article which the peculiar nature of the said paste may be specially adapted to; and the articles thus formed, will be superior in quality to any natural stone for the legitimate uses to which they may be applied.

5th. The said liquid silicate may also be employed as the cementing ingredient in the production of pudding-stone, sand-stone, marble, and all other artificial stones and in every variety of shape.

6th. The said liquid silicate may be used as an ingredient in the production of fire-proof paints in place of oil.

7th. The said liquid silicate may be used as an ingredient in the production of a water-proof coating composition for roofs, cellars, basements, vaults, sewers, pavements, &c.

8th. The said liquid silicate may also constitute the principal ingredient in the production of a water-proof cement to be used in the construction of brick and stone walls.

9th. The said liquid silicate may also be used for the purpose of producing fire-proof theatrical scenery, by first saturating the canvas with the said article and then painting the same with silicated paint.

10th. Cloths and clothing of all descriptions may be rendered water-proof and nearly fire-proof by saturating the same with the aforesaid liquid silicate.

11th. A thin transparent water-proof coating upon statuary, paintings, walls, furniture, metals, &c. may be produced by the use of the said liquid silicate.

12th. The said liquid silicate may be used in the place of starch in the laundry and in millinery establishments, and also in place of size in all manufacturing operations, and especially in the production of water-proof and fire-proof roofing-paper, cardboards, &c.

13th. The said liquid silicate may constitute one of the ingredients in the production of soap.

14th. Hams, eggs, fruits, vegetables, &c. may be preserved by giving them a silicious coating by the use of the said liquid silicate either by itself or when mixed with some other ingredient.

15th. The soles of boots and shoes may be rendered water-proof and an increased durability given to them by saturating them with the said liquid silicate.

What I claim as my invention, and desire to secure by Letters Patent, is—

Reducing silicious substances to a liquid state by first incorporating therewith a small proportion of some alkaline substance, and then subjecting the same to the direct action of super-heated steam while inclosed within a suitable vessel, substantially as herein set forth.

In witness whereof I have hereunto set my signature this twenty-first day of February, 1860.

GEORGE E. VANDERBURGH.

Witnesses:
LEMUEL W. SERRELL,
CHAS. H. SMITH.